United States Patent
Ishibashi et al.

(10) Patent No.: US 11,333,837 B2
(45) Date of Patent: May 17, 2022

(54) OPTICAL COMMUNICATION SYSTEM FOR RAIL-GUIDED TRUCK

(71) Applicants: MURATA MACHINERY, LTD., Kyoto (JP); KEIO UNIVERSITY, Tokyo (JP)

(72) Inventors: Masakazu Ishibashi, Kyoto (JP); Shinichiro Haruyama, Yokohama (JP)

(73) Assignees: MURATA MACHINERY, LTD., Kyoto (JP); KEIO UNIVERSITY, Tokyo (JP)

(*) Notice: Subject to any disclaimer, the term of this patent is extended or adjusted under 35 U.S.C. 154(b) by 248 days.

(21) Appl. No.: 16/643,903

(22) PCT Filed: Aug. 8, 2018

(86) PCT No.: PCT/JP2018/029828
§ 371 (c)(1),
(2) Date: Mar. 3, 2020

(87) PCT Pub. No.: WO2019/049598
PCT Pub. Date: Mar. 14, 2019

(65) Prior Publication Data
US 2020/0264389 A1    Aug. 20, 2020

(30) Foreign Application Priority Data
Sep. 7, 2017 (JP) .............................. JP2017-172130

(51) Int. Cl.
*G02B 6/42* (2006.01)
*B61B 3/02* (2006.01)
(Continued)

(52) U.S. Cl.
CPC ............. *G02B 6/4202* (2013.01); *B61B 3/02* (2013.01); *H04B 10/114* (2013.01); *H04B 10/2581* (2013.01)

(58) Field of Classification Search
CPC .... G02B 6/4202; G02B 6/429; G02B 6/4287; B61B 3/02; H04B 10/114; H04B 10/2581; H04B 10/25; H04B 10/80
(Continued)

(56) References Cited

U.S. PATENT DOCUMENTS 7,800,495 B1 * 9/2010 Parrish ............... G01N 21/7703
                                                340/540
2004/0076319 A1 * 4/2004 Fauver ............... G01N 21/4795
                                                382/133
(Continued)

FOREIGN PATENT DOCUMENTS

EP    2 056 492 A1    5/2009
JP    03-200202 A     9/1991
(Continued)

OTHER PUBLICATIONS

Official Communication issued in International Patent Application No. PCT/JP2018/029828, dated Oct. 2, 2018.

*Primary Examiner* — Abbas H Alagheband
(74) *Attorney, Agent, or Firm* — Keating & Bennett, LLP

(57) ABSTRACT

An optical communication system includes a first communication system to communicate first information from a controller to a truck and a second communication system to communicate second information. The first communication system includes a first light emitter to output the first information, a first optical fiber to transport the light output from the first light emitter while letting the light leak therefrom, and a first light receiver to receive the light leaking from the first optical fiber. The second communication system includes a second light emitter to output second information, a second optical fiber to transport the light output from the second light emitter and input to the second optical fiber at some point along the second optical fiber, and
(Continued)

a second light receiver to receive the light transported over the second optical fiber.

12 Claims, 11 Drawing Sheets

(51) Int. Cl.
 *H04B 10/114* (2013.01)
 *H04B 10/2581* (2013.01)
(58) Field of Classification Search
 USPC .......................................................... 104/139
 See application file for complete search history.

(56) References Cited

U.S. PATENT DOCUMENTS

| | | | | |
|---|---|---|---|---|
| 2006/0056855 | A1* | 3/2006 | Nakagawa | H04B 10/1141 398/183 |
| 2008/0019701 | A1* | 1/2008 | Tam | B61L 23/041 398/141 |
| 2009/0169147 | A1* | 7/2009 | Ellwood, Jr. | G02B 6/02 385/1 |
| 2010/0329619 | A1* | 12/2010 | Moore | H01L 31/0547 385/129 |
| 2011/0267598 | A1* | 11/2011 | Hjort | G01K 11/3206 356/32 |
| 2015/0369592 | A1* | 12/2015 | Fujita | G01B 11/24 356/601 |
| 2016/0060035 | A1* | 3/2016 | Higashi | B61L 15/0027 701/19 |
| 2016/0166130 | A1* | 6/2016 | Fujita | A61B 1/0017 250/227.14 |
| 2016/0174241 | A1* | 6/2016 | Ansari | H01Q 1/32 370/329 |
| 2016/0249233 | A1* | 8/2016 | Murray | H04W 16/26 |
| 2018/0062783 | A1* | 3/2018 | Mansouri Rad | H04J 14/0227 |
| 2018/0302158 | A1* | 10/2018 | Norval | H04B 10/11 |
| 2019/0222314 | A1* | 7/2019 | Eckle | H04B 10/1149 |
| 2019/0225250 | A1* | 7/2019 | Esprey | B61L 1/06 |
| 2021/0253149 | A1* | 8/2021 | Mian | B61L 23/042 |

FOREIGN PATENT DOCUMENTS

| | | | | |
|---|---|---|---|---|
| JP | 05-281393 A | | 10/1993 | |
| JP | 2003198445 A | * | 7/2003 | ....... H04B 10/25752 |
| JP | 2056492 A1 | * | 7/2007 | ............ H04B 10/12 |

* cited by examiner

OPTICAL COMMUNICATION SYSTEM FOR RAIL-GUIDED TRUCK

BACKGROUND OF THE INVENTION

1. Field of the Invention

The present invention relates to an optical communication system for a rail-guided truck.

2. Description of the Related Art

A conventional rail-guided truck is provided with a rail, a truck moving along the rail, and a controller that exchanges information with the truck. As an example of this type of technology, Japanese Unexamined Patent Publication No. 2016-53758 discloses a moving car system configured to convey objects near the ceiling by moving a moving car along a rail that is suspended from the ceiling. In the moving car system disclosed in Japanese Unexamined Patent Publication No. 2016-53758, the moving car is controlled by the wireless communication between the controller and the moving car.

In the conventional technology described above, due to the recent increase in the number of trucks and the information capacity, there are chances that the communication speed falls short when the trucks communicate with the controller in real-time. A wireless LAN is available as another communication method between the trucks and the controller. However, because the frequency range of the radio waves available to the wireless LAN is limited, and the wireless LAN is also used by systems other than the rail-guided truck system, communication may be obstructed by radio interference.

SUMMARY OF THE INVENTION

Preferred embodiments of the present invention provide optical communication systems for rail-guided trucks, each being capable of achieving high-speed real-time communication between the truck and the controller, without any radio interference.

An optical communication system for a rail-guided truck according to one aspect of a preferred embodiment of the present invention is an optical communication system used for a rail-guided truck that includes a rail, one or more trucks movable along the rail, and a controller configured or programmed to exchange information with the trucks, the optical communication system including a first communication system to communicate first information from the controller to the truck, and a second communication system to communicate second information from the truck to the controller, wherein the first communication system includes a first light emitter connected to the controller to output the first information in the form of light; a first optical fiber being an optical fiber laid along the rail to transport the light output from the first light emitter while letting the light leak therefrom, and a first light receiver mounted on the truck to receive the light leaking from the first optical fiber, and the second communication system includes a second light emitter mounted on the truck to output second information in the form of light, a second optical fiber being an optical fiber laid along the rail to transport the light output from the second light emitter and input to the second optical fiber at some point along the second optical fiber, or transport light generated by the light output from the second light emitter and input to the second optical fiber at some point along the second optical fiber, and a second light receiver connected to the controller to receive the light transported over the second optical fiber.

In this optical communication system for a rail-guided truck, separate optical fibers are installed for the first communication system and the second communication system, and the first optical fiber of the first communication system and the second optical fiber of the second communication system are laid along the rail. The first optical fiber is an optical fiber to transport light output from the first light emitter while letting the light leak therefrom. Because the first light receiver receives the light leaking from the first optical fiber, the first information can be communicated from the controller to the truck even while the truck is moving. The second optical fiber is able to transport the light output from the second light emitter and input to the second optical fiber at some point along the second optical fiber, or to transport light generated by the light output from the second light emitter and input to the second optical fiber at some point along the second optical fiber. Therefore, by inputting the light from the second light emitter to the second optical fiber at some point along the second optical fiber, the second information can be communicated from the truck to the controller, even while the truck is moving. Therefore, the first information and the second information can be exchanged between the controller and the truck using light, independently in real-time. Hence, it is possible to achieve a high-speed real-time communication between the truck and the controller without any radio interference.

According to one aspect of a preferred embodiment of the present invention, the first communication system may further include a first converter to convert the first information into a first signal output in the form of light from the first light emitter, and a first inverse converter mounted on the truck to convert the first signal received in the form of light by the first light receiver into the first information, and the second communication system may further include a second converter mounted on the truck to convert the second information into a second signal output in the form of light from the second light emitter, and a second inverse converter to convert the second signal received in the form of light by the second light receiver into the second information. With this configuration, the first signal converted from the first information and the second signal converted from the second information can be exchanged between the truck and the controller.

According to one aspect of a preferred embodiment of the present invention, the first converter may convert the first information into the first signal using a multi-carrier modulation. With this configuration, it is possible to divide the first information into pieces and to transmit the divided pieces of the first information simultaneously in a manner superimposed over one another (in a multiplexed fashion). Therefore, high-speed communication can be achieved in the first communication system.

According to one aspect of a preferred embodiment of the present invention, the second converter may convert the second information into the second signal using a multi-carrier modulation. With this configuration, it is possible to divide the second information into pieces and to transmit the divided pieces of the second information simultaneously in a manner superimposed over one another (in a multiplexed fashion). Therefore, high-speed communication can be achieved in the second communication system.

According to one aspect of a preferred embodiment of the present invention, the light may include at least one of infrared light, visible light, and ultraviolet light. By making such use of light, even higher data rate can be achieved between the truck and the controller, compared with when radio waves are used.

According to one aspect of a preferred embodiment of the present invention, the optical communication system for a rail-guided truck may include a plurality of the first optical fibers, and the first optical fibers may be connected serially via an amplifier. By connecting the first optical fibers serially in the manner described above, the distance by which the light is transported can be extended. Furthermore, because the amplifier can amplify the light being transported over the first optical fibers, it is possible to reduce or prevent a decrease in the light intensity due to attenuation.

According to one aspect of a preferred embodiment of the present invention, the optical communication system for a rail-guided truck may include a plurality of the second optical fibers, and the second optical fibers may be connected serially via an amplifier. By connecting the second optical fibers serially in the manner described above, the distance by which the light is transported can be extended. Furthermore, because the amplifier can amplify the light being transported over the second optical fibers, it is possible to reduce or prevent a decrease in the light intensity due to attenuation.

According to one aspect of a preferred embodiment of the present invention, the second optical fiber may include a plurality of slits on an outer circumferential surface of the second optical fiber. With this configuration, the light output from the second light emitter can be input to the second optical fiber via the slits.

According to one aspect of a preferred embodiment of the present invention, the second optical fiber may include a micro-lens array to collect, in the second optical fiber, the light with which an outer circumferential surface of the second optical fiber is irradiated. With this configuration, the light output from the second light emitter can be input to the second optical fiber via the micro-lens array.

According to one aspect of a preferred embodiment of the present invention, the second optical fiber may include a core doped with a fluorescent dye. With this configuration, the second optical fiber can cause the fluorescent dye to emit light, and transport the emitted light, by inputting the light output from the second light emitter to the core.

According to one aspect of a preferred embodiment of the present invention, the second optical fiber may include a core doped with a rare earth. With this configuration, the second optical fiber can cause the rare earth to emit light, and to transport the emitted light, by inputting the light output from the second light emitter to the core.

According to one aspect of a preferred embodiment of the present invention, the wavelength range of the light transported over the first optical fiber may be different from that of the light output from the second light emitter. With this configuration, even when the light leaking from the first optical fiber is input to the second optical fiber at some point along the second optical fiber, it is possible to reduce the emission of light from the fluorescent dye or the rare earth in the second optical fiber. In other words, it is possible to reduce or prevent interference of the light leaking from the first optical fiber with the second optical fiber. Therefore, the first optical fiber and the second optical fiber can be laid nearby each other.

According to one aspect of a preferred embodiment of the present invention, the first optical fiber and the second optical fiber may be flexible. With this configuration, for example, even when the rail is curved, the first optical fiber and the second optical fiber can be laid easily along the rail.

According to various preferred embodiments of the present invention, it is possible to provide optical communication systems for rail-guided trucks, each of the optical communication systems being capable of achieving high-speed real-time communication between the truck and the controller in real-time, without any radio interference.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
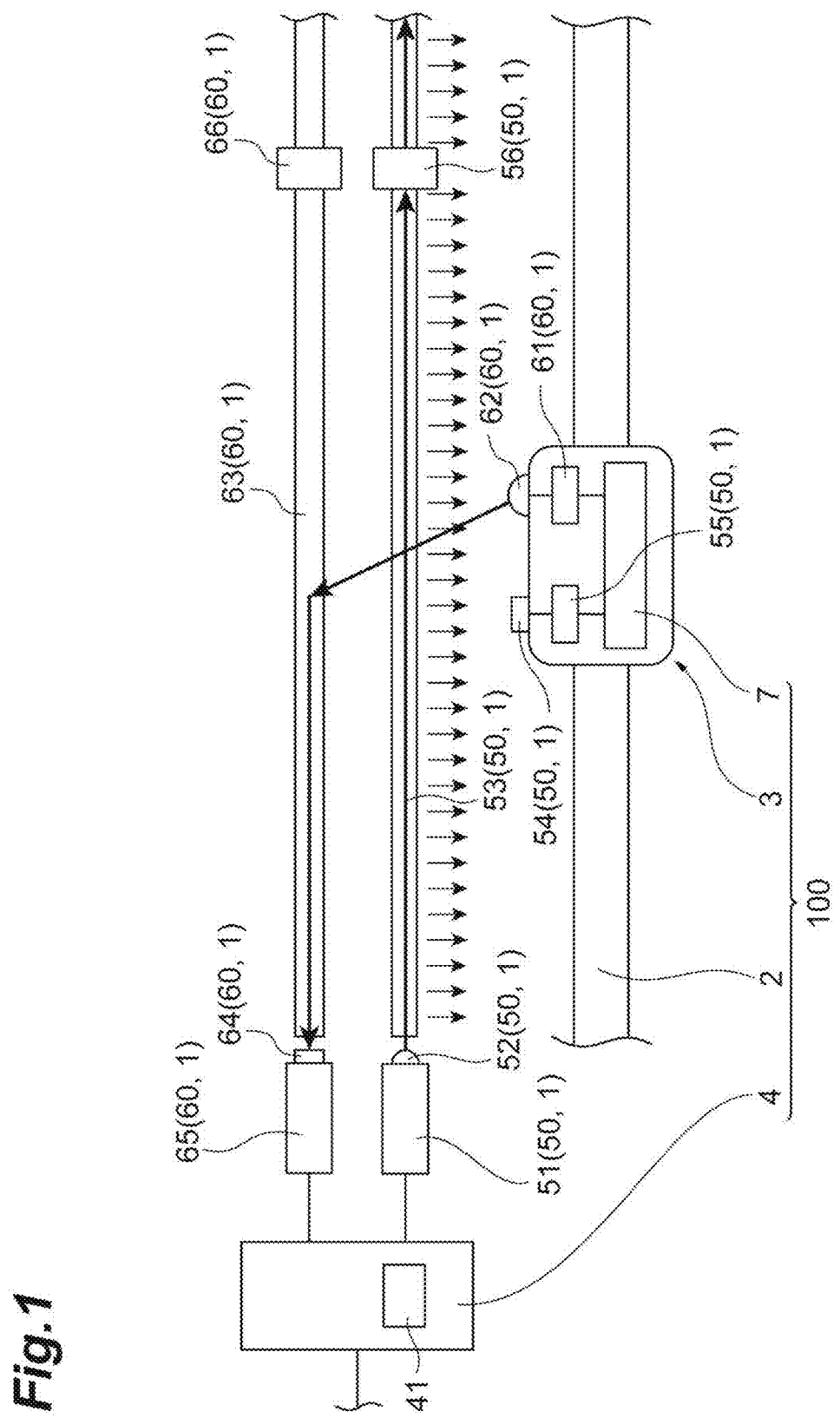
FIG. 1 is a diagram schematically illustrating a configuration of an optical communication system for a rail-guided truck according to a preferred embodiment of the present invention.

Various preferred embodiments will now be explained in detail with reference to some drawings. In the drawings, the same or equivalent elements are assigned with the same reference signs, and redundant explanations thereof will be omitted.

An optical communication system for a rail-guided truck according to a preferred embodiment of the present invention will now be explained with reference to FIG. 1. The optical communication system for a rail-guided truck is an optical communication system used for a rail-guided truck to convey articles along the rail. As illustrated in FIG. 1, the optical communication system 1 for a rail-guided truck according to the present preferred embodiment is used preferably for a rail-guided truck 100 implementing an overhead conveyor truck system used in a factory or a warehouse, for example. The rail-guided truck 100 includes a rail 2, a truck 3 moving along the rail 2, a controller 4 configured or programmed to exchange information with the truck 3, and a truck controller 7 mounted on the truck 3.

The optical communication system 1 for a rail-guided truck includes a first communication system 50 and a second communication system 60. The first communication system 50 is a communication system responsible for downlink communication to communicate first information from the controller 4 to the truck 3. The first communication system 50 includes a first converter 51, a first light emitter 52, a first optical fiber 53, a first light receiver 54, a first inverse converter 55, and an amplifier 56. The second communication system 60 is a communication system responsible for uplink communication to communicate second information from the truck 3 to the controller 4. The second communication system 60 includes a second converter 61, a second light emitter 62, a second optical fiber 63, a second light receiver 64, a second inverse converter 65, and an amplifier 66.

Figure 2:
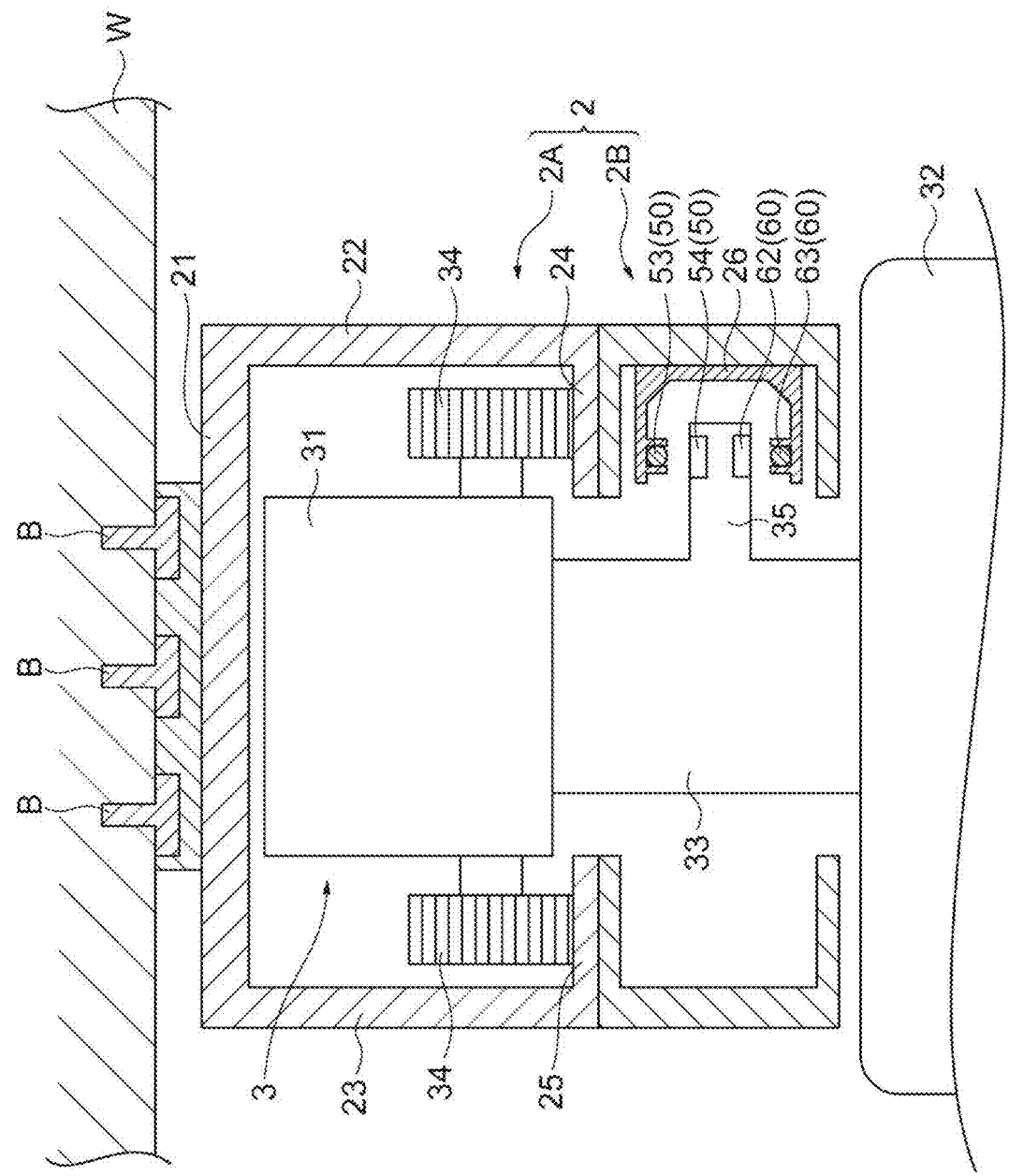
FIG. 2 is a sectional view schematically illustrating the configuration of the optical communication system for a rail-guided truck illustrated in FIG. 1.

The rail 2 has an inverted U-shaped cross section, providing a path along which the truck 3 moves, and the internal space of the rail 2 is shielded from the illumination installed on the ceiling W, and is dark. As illustrated in FIG. 2, the rail 2 is fixed to the ceiling W with fastening members such as bolts B, in a suspended manner. The rail 2 includes a first rail 2A along which the truck 3 moves, and second rails 2B in which the first optical fiber 53 in the first communication system 50 and the second optical fiber 63 in the second communication system 60 are laid.

The first rail 2A has a rectangle tubular shape, extending in a direction along an axial direction. The first rail 2A includes an upper wall 21 facing the ceiling W, side walls 22, 23 extending downwards from respective ends of the upper wall 21 in the width-direction, and runner rails 24, 25 extending inwards in a horizontal direction, in a manner approaching each other, from the bottom ends of the side walls 22, 23, respectively. There is an opening between the runner rail 24 and the runner rail 25. A carriage 31 (described later) of the truck 3 is disposed inside of the first rail 2A. Carriage wheels 34 (described later) of the truck 3 are placed on the runner rails 24, 25. In this manner, the carriage 31 is movable inside of the first rail 2A. The first rail 2A is made of a metallic material such as aluminum.

The second rails 2B are disposed under the first rail 2A. The second rails 2B are fixed to the bottom surfaces of the runner rails 24, 25 of the first rail 2A, respectively, using bolts, for example. The transverse section of the second rail 2B has a U-shape with an opening facing inwards. The second rails 2B are made of a metallic material such as aluminum. A holder 26 for holding the first optical fiber 53 and the second optical fiber 63 is provided inside of one of the second rails 2B that are provided as a pair.

The holder 26 is provided in plurality, and is disposed in a manner arranged along the rail 2 at a predetermined interval. The holder 26 is fixed to the inner side of the second rail 2B. The transverse section of the holder 26 has a U-shape corresponding to the shape of the second rail 2B. Such a holder 26 holds the first optical fiber 53 and the second optical fiber 63 in a manner extending along the second rail 2B, and separated from each other by a certain distance in an up-and-down direction, for example. With this configuration, the first optical fiber 53 and the second optical fiber 63 are laid along the rail 2, in a manner covered by the second rail 2B.

The truck 3 includes the carriage 31 disposed inside of the first rail 2A, a main unit 32 in which a load is loaded, and a joint unit 33 that joins the carriage 31 to the main unit 32. The truck 3 is moved by receiving a supply of power contactlessly from a high-frequency current line (not illustrated) laid inside of the second rail 2B, for example. The carriage 31 is provided with a plurality of carriage wheels 34. The carriage wheels 34 are rotated by a motor (not illustrated) provided inside of the carriage 31, for example. The carriage wheels 34 are placed on the runner rails 24, 25 of the first rail 2A. The joint unit 33 moves through the opening provided between the runner rail 24 and the runner rail 25, and through between the pair of the second rails 2B. With this configuration, the truck 3 is carried along the rail 2, in a manner suspended from the rail 2.

The truck 3 includes a communicator 35 to communicate with the controller 4. In the example illustrated, the communicator 35 protrudes from the joint unit 33, in a manner entering into the inside of the holder 26. On the communicator 35, the first light receiver 54 is disposed in a manner facing the first optical fiber 53. In the communicator 35, the second light emitter 62 is disposed in a manner facing the second optical fiber 63. With this configuration, the truck 3 moves along the rail 2, with the first light receiver 54 facing the first optical fiber 53, and with the second light emitter 62 facing the second optical fiber 63. The configuration of the truck 3 is not limited to the example illustrated in FIG. 2, and various configurations may be used depending on factors such as the specifications.

Referring back to FIG. 1, the controller 4 exchanges information (signals) with the truck 3. The controller 4 includes a signal source 41 to generate the first information to be transmitted to the truck 3. The controller 4 may be implemented as a micro-computer system including a central processing unit (CPU), a random access memory (RAM), and a read-only memory (ROM), for example. The controller 4 is connected to the higher-level control device (not illustrated). The second information transmitted from the truck 3 is transmitted to the higher-level control device via the controller 4, for example. The first information may include a signal to control a movement of the truck 3 and a transfer of the load, for example. The second information may include information indicating the status of the truck 3 and image data captured by a camera mounted on the truck 3, for example.

The truck controller 7 is mounted on the truck 3, and is connected to the first inverse converter 55 and the second converter 61. The truck controller 7 controls the truck 3 based on the first information received from the controller 4. The truck controller 7 generates the second information to be transmitted from the truck 3 to the controller 4, and transmits the second information to the second converter 61. The truck controller 7 may be implemented as a micro-computer system including a CPU, a RAM, and a ROM, for example, in the same manner as the controller 4.

The first communication system 50 will now be explained specifically.

The first converter 51 is connected between the controller 4 and the first light emitter 52. The first converter 51 converts the first information generated by the signal source 41 in the controller 4 into a first signal that is an electric signal. The converted first signal is transmitted to the first light emitter 52. As a method of converting the first information into the first signal, a known conversion method, such as a baseband modulation that is one type of intensity modulation, may be used.

The first light emitter 52 is connected to the controller 4 via the first converter 51. The first light emitter 52 converts the first signal, which is resultant of causing the first converter 51 to convert the first information, into light (optical signal). With this configuration, the first light emitter 52 is caused to output (emit) the first information in the form of light. The first light emitter 52 is provided at or near an end of the first optical fiber 53 so that the light output therefrom becomes incident on the first optical fiber 53. As the first light emitter 52, for example, a laser diode (LD) or a light emitting diode (LED) may be used. It is preferable for the first light emitter 52 to have quick response characteristics and a sharp directivity. Therefore, a laser diode is more preferable than an LED as the first light emitter 52. The light output from the first light emitter 52 includes at least one of infrared light, visible light, and ultraviolet light. As an example, the light output from the first light emitter 52 is preferably red light at about 658 nm or so, from the viewpoint of keeping the cost of the product as low as possible, and infrared light is preferable from the viewpoint of ensuring safety for the human eyes. The output of the first light emitter 52 may be set to several mW to several tens mW or so, for example.

The first optical fibers 53 are laid (stretched), along the rail 2, as described above. The first optical fiber 53 is an optical fiber to transport the light output from the first light emitter 52 while letting the light leak therefrom, by taking advantage of diffusion of light. In other words, the first optical fiber 53 is a leaky optical fiber from which part of the transported light leaks, across the intermediate section of the transport path. Therefore, in the section where the first optical fiber 53 is laid, the light is leaking from the first optical fiber 53. The first optical fiber 53 is also flexible.

The amplifier 56 is disposed between the ends of a plurality of the first optical fibers 53. The amplifier 56 connects a pair of adjacent first optical fiber 53 serially. As the amplifier 56, an optical amplifier to amplify light may be used. Examples of the optical amplifier includes a fiber amplifier that uses a fiber doped with a rare earth, and a semiconductor optical amplifier. As the amplifier 56, a photoelectric converter may also be used. In such a configuration, the photoelectric converter can amplify light between the first optical fibers 53 by converting the light output from one of the first optical fibers 53 into an electric signal, amplifying the electric signal, converting the electric signal into light, and inputting the light to the other first optical fiber 53, for example.

The first light receiver 54 is mounted on the truck 3. More specifically, the first light receiver 54 is provided to the communicator 35 in the truck 3, in a manner facing the first optical fiber 53 (see FIG. 2). The distance between the first light receiver 54 and the first optical fiber 53 may be set to about 5 mm to about 20 mm or so, for example. The first light receiver 54 receives the light leaking from the first optical fiber 53, and converts the light into the first signal that is an electric signal. As the first light receiver 54, an avalanche photodiode may be used, for example.

The first inverse converter 55 is mounted on the truck 3. The first inverse converter 55 is connected between the first light receiver 54 and the truck controller 7. The first inverse converter 55 performs an inverse conversion of the first signal received in the form of light by the first light receiver 54, into the first information. The first information resultant of the inverse conversion is transmitted to the truck controller 7, for example.

Figure 3:
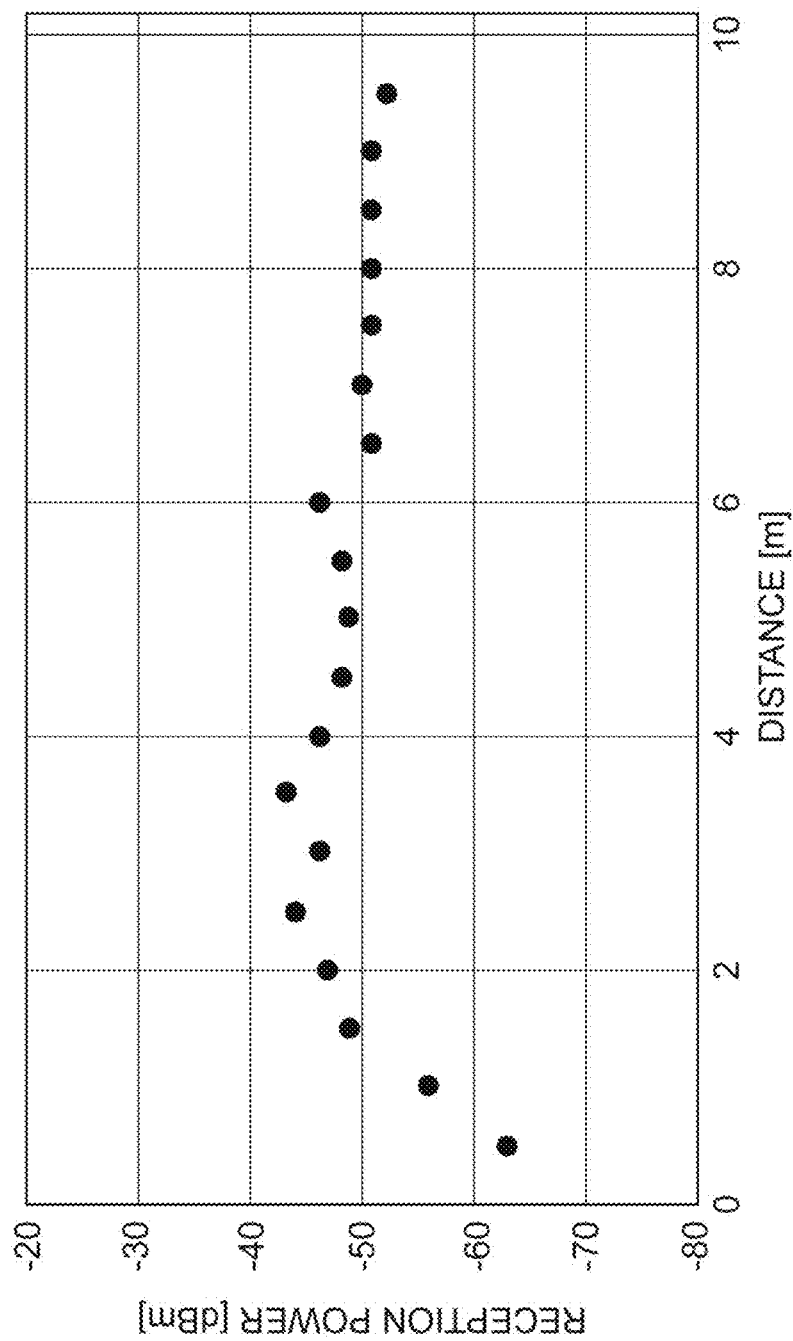
FIG. 3 is a diagram illustrating a transport performance of a first optical fiber.

A transport performance of the first optical fiber 53 will now be explained with reference to FIG. 3. In the example explained herein, to evaluate the transport performance of the first optical fiber 53, the intensity of the light leaking from the first optical fiber was measured while changing the distance of the measurement point from the light source. As the first optical fiber, Fibrance (registered trademark, Corning Inc.) having a total length of 10 m was used. As the light source, a laser diode operating at a wavelength of 650 nm and an output of 4 mW was used. As the signal input to the light source, a sine wave at a frequency of 10 MHz was used. As the light receiver to receive the leaking light, an avalanche photodiode was used. The electric signal output from the avalanche photodiode was amplified using a photosensor amplifier, and the signal was measured using a spectrum analyzer. In other words, the light leaking from the first optical fiber 53 was measured as a reception power. As illustrated in FIG. 3, even when the distance from the light source was increased, the reception power remained somewhat constant, without exhibiting a remarkable decrease. Therefore, it can be confirmed that the first optical fiber 53 is capable of transporting light without causing much attenuation.

A communication performance of the first optical fiber 53 will now be explained. In the example explained herein, to evaluate the communication performance of the first optical fiber 53, a light source was caused to output a modulated signal in the form of light. The modulated signal was then input to the first optical fiber 53, and the bit error rate (BER) of the signal transported over the first optical fiber 53 was measured. As the light source, a laser diode operating at a wavelength of 658 nm and an output of 4 mW was used. As the signal modulation format, non-return-to-zero (NRZ) was used. As the first optical fiber 53, Fibrance (registered trademark, Corning Inc.) having a total length of 1 m was used. As the light receiver, an avalanche photodiode was used, and the light leaking from the first optical fiber 53 was received at a position of 50 cm from the end of the first optical fiber 53. At this time, the output of the light source was incrementally reduced using an optical attenuator, and adjusted in such a manner that the light intensity measured by the light receiver would be 67 $nW/mm^2$, 31 $nW/mm^2$, 18 $nW/mm^2$, 8.3 $nW/mm^2$, 3.2 $nW/mm^2$, 1.5 $nW/mm^2$, 0.72 $nW/mm^2$, and 0.26 $nW/mm^2$, and the BER was measured at each of these settings. In these measurements, the BER was measured using two different communication speeds of 10 Mbps and 100 Mbps. In these measurements, the upper boundary of the BER at which a reasonable communication performance is ensured was set to $10^{-3}$.

The measurement results indicated that, at the communication speed of 10 Mbps, when the intensity of the light received at the light receiver was at a level equal to or higher than about 3.2 $nW/mm^2$, the BER was maintained at a level equal to or lower than about $10^{-3}$, and the communication performance was successfully ensured. The measurement results also indicated that, at the communication speed of 100 Mbps, when the intensity of the light received at the light receiver was at a level equal to or higher than about 8.3 $nW/mm^2$, the BER was maintained at a level equal to or lower than about $10^{-3}$, and the communication performance was successfully ensured. Based on these results, it can be concluded that, when the total length of the first optical fiber 53 is about 1 m, and the communication speed is 100 Mbps, it is possible to keep the BER to a level equal to or lower than about $10^{-3}$ sufficiently even if the output of the light source is attenuated to a level equivalent to about 0.2 mW using an optical attenuator. Therefore, by making a calculation based on this conclusion, it can be expected that, by setting the output of the light source to about 20 mW or so, signals can be received at a distance of about 100 m or so at the communication speed of about 100 Mbps. Based on this result, by setting the output of the light source to about 20 mW, the signals transmitted from the light source at the communication speed of about 100 Mbps can be communicated to a distance of about 100 m or so, by receiving the light leaking from the first optical fiber 53. Therefore, it can be confirmed that the first communication system 50 can be applied to an overhead conveyor truck system used in a factory or a warehouse.

Referring back to FIG. 1 again, the second communication system 60 will now be explained specifically.

The second converter 61 is connected between the truck controller 7 and the second light emitter 62. The second converter converts the second information generated by the truck controller 7 into a second signal that is an electric signal. The converted second signal is transmitted to the second light emitter 62. As a method of converting the second information into the second signal, a known conversion method such as a baseband modulation may be used, in the same manner as the first converter 51.

The second light emitter 62 is mounted on the truck 3. More specifically, the second light emitter 62 is provided to the communicator 35 in the truck 3, in a manner facing the second optical fiber 63 (see FIG. 2). The second light emitter 62 is connected to the truck controller 7 via the second converter 61. The second light emitter 62 converts the second signal, which is resultant of causing the second converter 61 to convert the second information, into light. With this configuration, the second light emitter 62 outputs the second information in the form of light.

As the second light emitter 62, a laser diode or an LED may be used, for example. It is preferable for the second light emitter 62 to have quick response characteristics and a sharp directivity. Therefore, a laser diode is more preferable than an LED as the second light emitter 62. As an example, the wavelength range of the light output from the second light emitter 62 is about 405 nm or so, when a fiber doped with a fluorescent dye described later is used as the second optical fiber 63. In this manner, it is preferable for the wavelength range of the light output from the second light emitter 62 to be different from that of the light transported over the first optical fiber 53 (the light leaking from the first optical fiber 53). The output of the second light emitter 62 may be set to several mW to several tens mW or so, for example. The light output from the second light emitter 62 is preferably red light at about 658 nm or so, from the viewpoint of keeping the cost of the product as low as possible, and infrared light is preferable from the viewpoint of ensuring safety for the human eyes. The second light emitter 62 is disposed in a manner separated from the first light receiver 54 by a predetermined length. With this configuration, it is possible to reduce or prevent the possibilities of the light output from the second light emitter 62 becoming incident on the first light receiver 54, and obstructing the communication of the first communication system 50. A partition or the like to shield the light output from the second light emitter 62 may be provided between the second light emitter 62 and the first light receiver 54.

Figure 4:
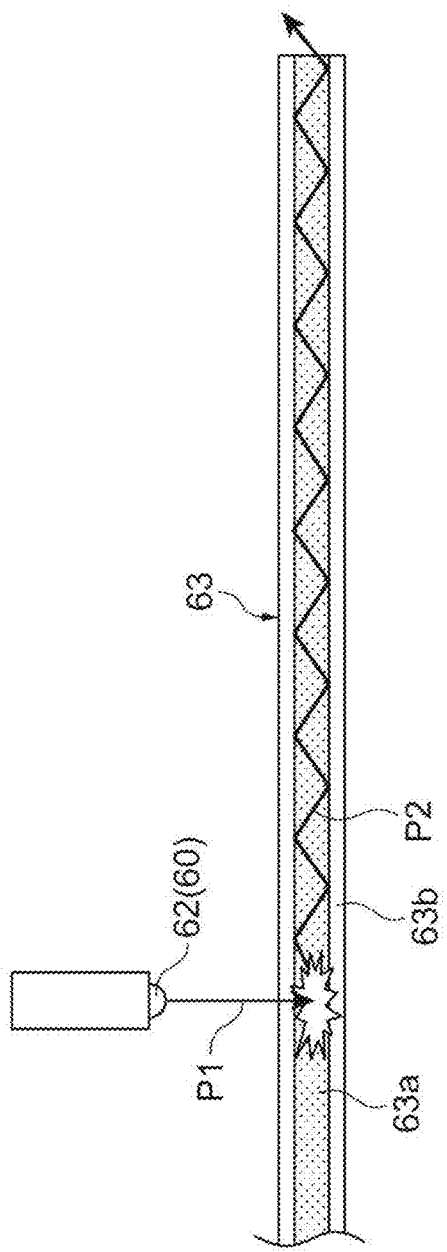
FIG. 4 is a diagram for explaining transportation of light over a second optical fiber.
Figure 5:
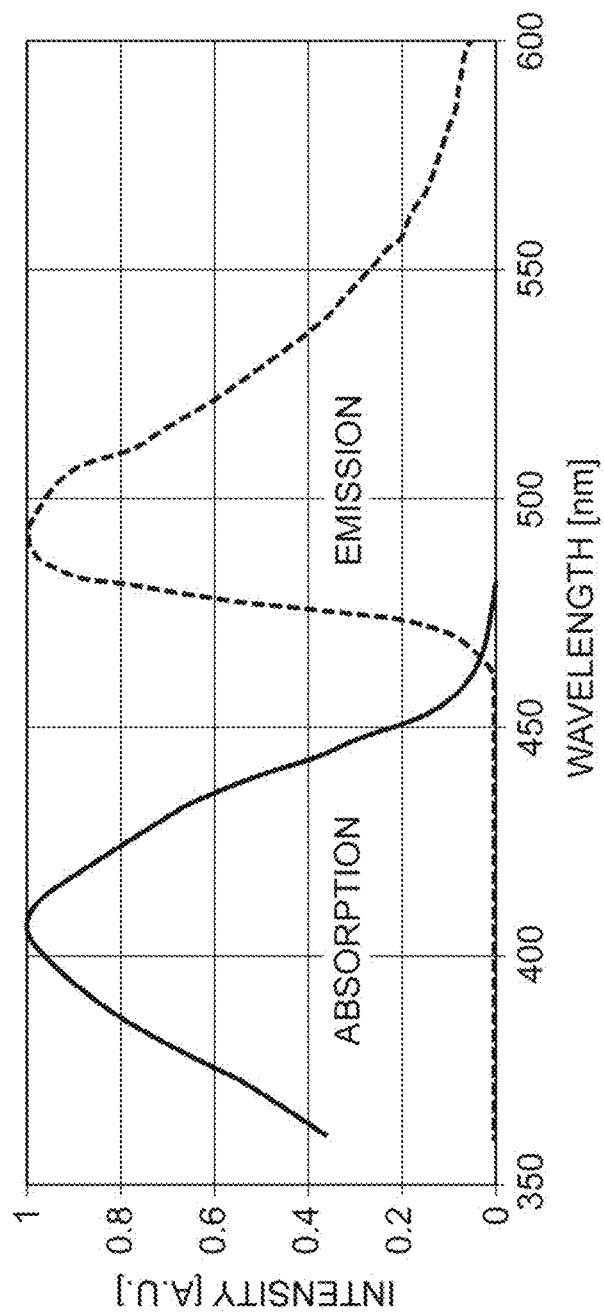
FIG. 5 is a diagram illustrating an absorption wavelength and an emission wavelength of a fluorescent dye with which a core of the second optical fiber is doped.

The second optical fibers 63 are laid (stretched), along the rail 2, as described above. The second optical fiber 63 is an optical fiber to transport light generated by the light output from the second light emitter 62 and input to the second optical fiber 63 at some point along the second optical fiber 63. In other words, the second optical fiber 63 is an optical fiber along which the light generated by the light input to the transport path at some point along the transport path propagates. As illustrated in FIG. 4, the second optical fiber 63 is an optical fiber including a fluorescent dye-doped core 63a and a clad 63b. When light P1 output from the second light emitter 62 and input via the outer circumferential surface of the core 63a enters the core 63a of the second optical fiber 63, the fluorescent dye become excited by the light P1. As a result, the fluorescent dye emits light P2 in all directions. Among the light P2 generated by the fluorescent dye, the light P2 introducing into the clad 63b at an angle less than the critical angle between the core 63a and the clad 63b is transported along the second optical fiber 63. In other words, the second optical fiber 63 can transport the second signal carried by the light P1 input to the transport path, along the second optical fiber 63, using a wave-optical approach. The second optical fiber 63 is a flexible optical fiber. FIG. 5 illustrates a preferable example of the second optical fiber 63. The second optical fiber 63 in this example absorbs the light P1 having a wavelength of about 360 nm to about 450 nm or so, and emits light P2 having a wavelength of about 470 nm to about 600 nm or so. The maximum absorption wavelength of the second optical fiber 63 is about 405 nm, and the maximum emission wavelength is about 492 nm.

The amplifier 66 is disposed between ends of a plurality of the second optical fibers 63. The amplifier 66 connects a pair of adjacent second optical fiber 63 serially. As the amplifier 66, an optical amplifier amplifying light or a photoelectric converter may be used, in the same manner as the amplifier 56.

The second light receiver 64 is connected to the controller 4 via the second inverse converter 65. The second light receiver 64 receives the light transported over the second optical fiber 63, and converts the light into the second signal that is an electric signal. The second light receiver 64 is provided to an end or near the end of the second optical fiber 63 so that the light P2 output from the end of the second optical fiber 63 can be received. As the second light receiver 64, an avalanche photodiode may be used, for example.

The second inverse converter 65 is connected between the second light receiver 64 and the controller 4. The second inverse converter 65 performs an inverse conversion of the second signal received in the form of light by the second light receiver 64 into the second information. The second information resultant of the inverse conversion is transmitted to the controller 4, for example.

A transport performance of the second optical fiber 63 as an example will now be explained with reference to FIG. 6. In the example explained herein, to evaluate the transport performance, an experiment was carried out to measure the intensity of the light P2 transported over the second optical fiber 63 while changing the position to input the light P1 to the second optical fiber 63. As the second optical fiber 63, a wavelength shifter fiber having a total length of 100 m or so was used. As the light source, a laser diode operating at a wavelength of about 405 nm and an output of about 3 mW was used. The distance between the light source and the second optical fiber 63 was set to about 5 mm. A light detection sensor is disposed at an end of the second optical fiber, and the intensity of the light P2 transported over the second optical fiber 63 was measured.

Figure 6:
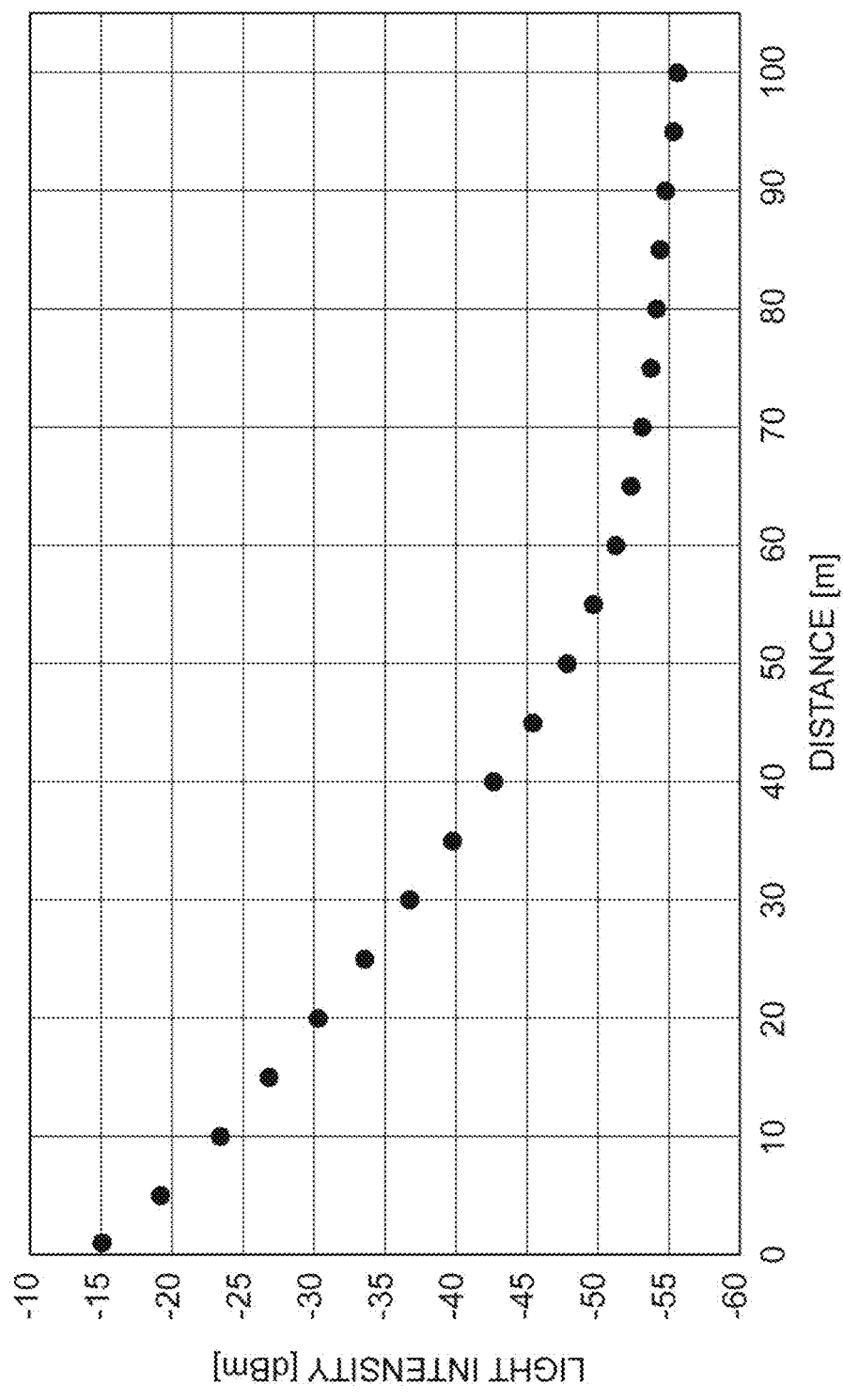
FIG. 6 is a diagram illustrating a transport performance of the second optical fiber.

As illustrated in FIG. 6, as the distance between the input position to input the light P1 to the second optical fiber 63 and the light detection sensor was increased, the intensity of the light P2 decreased. Therefore, it can be confirmed that, as the distance between the input position of the light P1 and the light detection sensor was increased, the transported light P2 attenuated more. However, for example, even if the distance between the input position of the light P1 and the light detection sensor is about 100 m, the intensity of the light P2 remained at approximately −55 dBm or so, and the intensity from which the signal transmitted from the light source can be received was maintained. Therefore, it was confirmed that the signal transmitted from the light source at a distance of about 100 m can be received by using the second optical fiber 63 according to this example, and by receiving the light P2 generated by the light P1 having been input at some point along the second optical fiber 63. Therefore, it can be confirmed that the second communication system 60 can be applied to an overhead conveyor truck system in a factory or a warehouse.

One example of the downlink communication from the controller 4 to the truck 3 will now be explained. For example, the signal source 41 in the controller 4 generates the first information based on a command issued by a higher-level controller. The first converter 51 then converts the generated first information into a first signal, and the first signal is transmitted to the first light emitter 52. The first light emitter 52 outputs light corresponding to the first signal. The light from the first light emitter 52 is input to the first optical fiber 53 via the end of the first optical fiber, and a portion of the light leaks out of the first optical fiber 53 while being transported over the first optical fiber 53.

At this time, in the truck 3, the first light receiver 54 receives the light leaking from the first optical fiber 53, and converts the light into the first signal. The first inverse converter 55 performs an inverse conversion of the first signal into the first information, and transmits the first information to the truck controller 7. The truck controller 7 controls the movement of the truck 3 and the transfer of the load, based on the first information. In the section where the first optical fiber 53 is laid, because the light corresponding to the first information is leaking from the first optical fiber 53, the first information can be communicated from the controller 4 to the truck 3 without any interruption, regardless of whether the truck 3 is not moving or moving.

One example of the uplink communication from the truck 3 to the controller 4 will now be explained. For example, based on the result of image capturing performed by a camera on the truck 3 or the status of the truck 3, the truck controller 7 generates the second information. The second converter 61 then converts the generated second information into a second signal, and transmits the second signal to the second light emitter 62. The second light emitter 62 outputs light P1 corresponding to the second signal. The light P1 output from the second light emitter 62 is input to the second optical fiber 63 at some point along the second optical fiber 63. In the second optical fiber 63, the fluorescent dye becomes excited by the input light, and caused to emit light. The emitted light P2 is then transported over the second optical fiber 63, and is output from the end of the second optical fiber 63. The second light receiver 64 receives the light P2 output from the second optical fiber 63, and converts the light into a second signal. The second inverse converter 65 performs an inverse conversion of the second signal into the second information, and transmits the second information to the higher-level controller, for example. In the section where the second optical fiber 63 is laid, by causing the second light emitter 62 in the truck 3 to input the light P1 corresponding to the second information at some point along the second optical fiber 63, the second information can be communicated from the truck 3 to the controller 4 without any interruption, regardless of whether the truck 3 is stopped or moving.

As explained above, in the optical communication system 1 for a rail-guided truck, separate optical fibers are provided in the first communication system 50 and the second communication system 60, and the first optical fiber 53 in the first communication system 50 and the second optical fiber 63 in the second communication system 60 are laid along the rail 2. The first optical fiber 53 is an optical fiber to transport the light output from the first light emitter 52 while letting the light leak therefrom. Therefore, by causing the first light receiver 54 to receive the light leaking from the first optical fiber 53, the first information can be communicated from the controller 4 to the truck 3, even while the truck 3 is moving. The second optical fiber 63 transports the light generated by the light output from the second light emitter 62 and input at some point along the second optical fiber 63. Therefore, by inputting the light from the second light emitter 62 at some point along the second optical fiber 63, the second information can be communicated from the truck 3 to the controller 4, even while the truck 3 is moving. Hence, the communication of the first information and the second information between the controller 4 and the truck 3 can be performed independently in real time, using light. Therefore, high speed and real-time communication can be achieved between the truck 3 and the controller 4 without any radio interference.

In the optical communication system 1 for a rail-guided truck, the first optical fiber 53 and the second optical fiber 63 are laid along the rail 2 in a manner covered by the second rail 2B. With this configuration, it is possible to reduce or prevent leakage of the light leaking from the first optical fiber 53 to the external of the rail 2. Therefore, it is possible to reduce or prevent the possibilities of the external device or the like being affected by the light leaking from the first optical fiber 53. Furthermore, because entry of external light to the second optical fiber 63 is also reduced or prevented, it is possible to reduce or prevent obstruction of the communication of the second information over the second communication system 60 by the external light (e.g., illumination installed on the ceiling W).

In the optical communication system 1 for a rail-guided truck, the first communication system 50 further includes the first converter 51 to convert the first information output from the first light emitter 52 in the form of light, into a first signal, and the first inverse converter 55 mounted on the truck 3, and to convert the first signal received in the form of light by the first light receiver 54 into the first information, and the second communication system 60 further includes the second converter 61 mounted on the truck 3, and to convert second information output from the second light emitter 62 in the form of light, into a second signal, and the second inverse converter 65 configured to convert the second signal received in the form of light by the second light receiver 64, into the second information. With this configuration, communication between the truck 3 and the controller 4 can be performed using the converted first signal and second signal.

In the optical communication system 1 for a rail-guided truck, the light includes at least one of infrared light, visible light, and ultraviolet light. By making such use of light, compared with when a radio wave is used, even higher data rate can be achieved between the truck 3 and the controller 4.

The optical communication system 1 for a rail-guided truck includes a plurality of the first optical fibers 53, and the first optical fibers 53 are connected to each other serially via the amplifier 56. By connecting the first optical fibers 53 serially in the manner described above, the distance by which the light is transported can be extended. Furthermore, because the amplifier 56 can amplify the light being transported over the first optical fibers 53, it is possible to reduce or prevent a decrease in the light intensity due to attenuation.

The optical communication system 1 for a rail-guided truck includes a plurality of the second optical fibers 63, and the second optical fibers 63 are connected to each other serially via the amplifier 66. By connecting the second optical fibers 63 serially in the manner described above, the distance by which the light is transported can be extended. Furthermore, because the amplifier 66 can amplify the light being transported over the second optical fibers 63, it is possible to reduce or prevent a decrease in the light intensity due to attenuation.

In the optical communication system 1 for a rail-guided truck, the second optical fiber 63 includes the fluorescent dye-doped core 63*a*. With this configuration, by inputting the light output from the second light emitter 62 to the second optical fiber 63, the second optical fiber 63 can cause the fluorescent dye to emit light, and can transport the emitted light. Therefore, the light generated by the light output from the second light emitter 62 can be transported to the second light receiver 64.

In the optical communication system 1 for a rail-guided truck, the wavelength range of the light transported over the first optical fiber 53 is different from that of the light output from the second light emitter 62. With this configuration, even if the light leaking from the first optical fiber 53 is input to the second optical fiber 63 at some point thereof, it is possible to reduce or prevent emission of light by the fluorescent dye in the second optical fiber 63. In other words, interference of the light leaking from the first optical fiber 53 to the second optical fiber 63 is reduced or prevented. Therefore, the first optical fiber 53 and the second optical fiber 63 can be laid nearby each other.

In the optical communication system 1 for a rail-guided truck, the first optical fiber 53 and the second optical fiber 63 are flexible. With this configuration, even when the rail 2 is curved, for example, the first optical fiber 53 and the second optical fiber 63 can be easily laid along the rail 2.

A modification of the second optical fiber 63 will now be explained with reference to FIG. 7.

Figure 7:
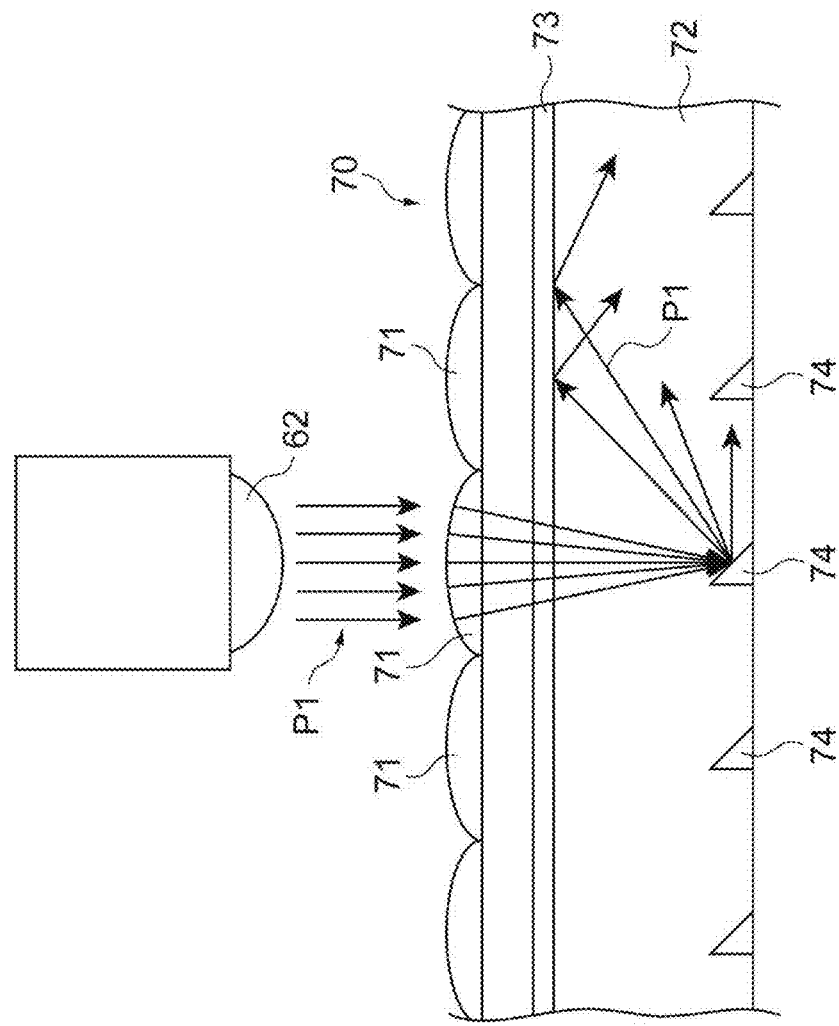
FIG. 7 is a diagram schematically illustrating a modification of the second optical fiber.

As illustrated in FIG. 7, a second optical fiber 70 according to the modification includes a micro-lens array 71 to collect the light P1 input to the outer circumferential surface of the second optical fiber 70, into the second optical fiber 70, a core 72, a clad 73, and a plurality of wedge-shaped structures 74. The wedge-shaped structures 74 are provided inside of the core 72. The wedge-shaped structures 74 are disposed at positions corresponding to the point of focus of the respective micro-lenses. The light P1 collected in the second optical fiber 70 via the micro-lens array 71 is reflected by the wedge-shaped structures 74, and propagates through the core 72. In the manner described above, in the second optical fiber 70, the transportation of the light P1 that is input at some point along the transport path of the second optical fiber 70 is made possible using a geometrical-optical approach.

Unlike the second optical fiber 63 (see FIG. 1), the core 72 of the second optical fiber 70 according to the modification is not doped with a fluorescent dye. Even when such a second optical fiber 70 is used, the light P1 output from the second light emitter 62 can be input to the second optical fiber 70 via the micro-lens array 71, and transported over the second optical fiber 70. The second information can be communicated from the truck 3 to the controller 4 reliably. Details such as the structure and the principle of the second optical fiber 70 are disclosed in U.S. Patent Application Publication 2010/0329619, for example, and the descriptions thereof are included in the scope of the invention, as defined by the appended claims.

Another modification of the second optical fiber 63 will now be explained with reference to FIG. 8.

Figure 8:
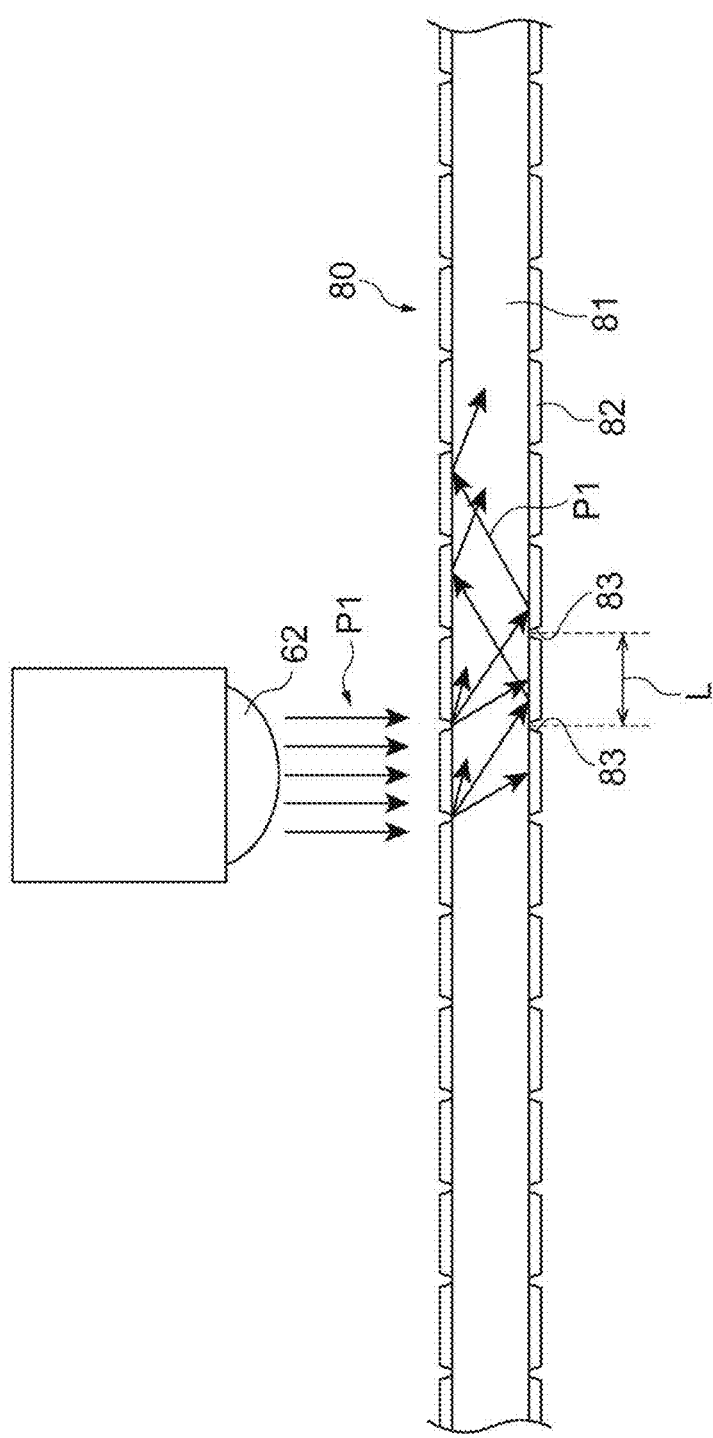
FIG. 8 is a diagram schematically illustrating another modification of the second optical fiber.

As illustrated in FIG. 8, a second optical fiber 80 according to the other modification includes a core 81 and a clad 82. A plurality of slits 83 are provided on the outer circumferential surface of the second optical fiber 80. The slits penetrate through the clad 82, and extend along the circumferential direction of the second optical fiber 80. A distance L between the adjacent slits 83 is set smaller than the irradiation width (the beam diameter of) of the light P1 output from the second light emitter 62. The core 81 of the second optical fiber 80 is not doped with a fluorescent dye, in the same manner as the core 72 of the second optical fiber 70 (see FIG. 7). The light output from the second light emitter 62 enters the second optical fiber 80 via the slits 83, and propagate through the core 81. In the manner described above, in the second optical fiber 80, the transportation of the light P1 input from some point along the transport path of the second optical fiber 80 is made possible using geometrical-optical approach.

In the second optical fiber 80, too, the light P1 output from the second light emitter 62 can be input to the second optical fiber 70 via the slits 83, and transported over the second optical fiber 80. Therefore, the second information can be communicated from the truck 3 to the controller 4. Furthermore, the distance L between the adjacent slits 83 is set smaller than the irradiated width of with the light P1 output from the second light emitter 62. With this configuration, some of the slits 83 are always irradiated with the light output from the second light emitter 62, even if the truck 3 is moving. Therefore, it is possible to keep the light P1 being input into the second optical fiber 80 even if the truck 3 is moving.

Some preferred embodiments of the present invention have been explained above, but various modifications of the present invention are still possible, without limitation to the preferred embodiments described above.

Explained in the preferred embodiments described above is an example in which the second optical fiber 63 includes the fluorescent dye-doped core 63*a*. Examples of the fluorescent dye include an organic fluorescent substance or a rare earth metal. With a rare earth metal, by inputting the light output from the second light emitter 62 to the second optical fiber 63, the second optical fiber 63 can cause the rare earth to emit light and transport the emitted light. As the rare earth with which the core is doped, erbium, ytterbium, neodymium, thulium, or holmium, for example, may be used.

Explained in the preferred embodiments described above is an example in which the optical communication system 1 for a rail-guided truck includes each of the first communication system 50 and the second communication system 60 in singularity, but the optical communication system 1 for a rail-guided truck may include a plurality of the first communication systems 50, and a plurality of the second communication systems 60. With such a configuration, because the communication between the truck 3 and the controller 4 can be performed using a plurality of the first communication systems 50 or a plurality of the second communication systems 60, the communication speed between the truck 3 and the controller 4 can be improved further.

In other words, it is possible to lay a plurality of the first optical fibers 53 in parallel, as the first communication system 50, and to lay a plurality of the second optical fibers 63 in parallel as the second communication system 60. In such a configuration, it is possible to use each of the optical fibers 53, 63 for a different purpose, e.g., to transport control signals, to transport management information, and to transport captured images. Furthermore, when the number of the trucks 3 is in plurality, the available bandwidth can be increased by using different optical fibers 53, 63 depending on the truck 3 with which the communication is to be established. It is also possible to use wavelengths that are different from one another, for the light transported over the respective optical fibers 53, 63.

Explained in the preferred embodiments described above is an example in which there is one truck 3, but the number of the trucks 3 may be in plurality. Explained in the preferred embodiments described above is an example in which the first optical fiber 53 and the second optical fiber 63 are laid in a manner separated from each other, but the first optical fiber 53 and the second optical fiber 63 may be laid adjacently to each other.

In the preferred embodiments described above, the first communication system 50 may also include a filter covering the first light receiver 54, and configured to pass only the light within the wavelength range to be transported over the first optical fiber 53. With this configuration, it is possible to shield the light other than the light transported over the first optical fiber 53, e.g., the light output from the second light emitter 62 and the external light. Therefore, the first communication system 50 can communicate the first information more reliably. In the same manner, the second communication system 60 may also include a filter covering the second light receiver 64, and may pass only the light within the wavelength range to be transported over the second optical fiber 63. With this configuration, it is possible to shield the light other than the light transported over the second optical fiber 63, e.g., the light output from the first light emitter 52 and the external light. Therefore, the second communication system 60 can communicate the second information more reliably.

Explained in the preferred embodiments described above is an example in which the optical communication system 1 for a rail-guided truck includes the first converter 51, the first inverse converter 55, the second converter 61, and the second inverse converter 65, but the optical communication system 1 for a rail-guided truck do not necessarily need to include the first converter 51, the first inverse converter 55, the second converter 61, and the second inverse converter 65. In other words, the optical communication system 1 for a rail-guided truck may optically communicate the first information and the second information, without converting the information to the first signal and the second signal.

Explained in the preferred embodiments described above is an example in which the first optical fibers 53 are connected to each other via the amplifier 56, and the second optical fibers 63 are connected to each other via the amplifier 66, but the optical communication system 1 for a rail-guided truck do not necessarily need to be provided with the amplifiers 56, 66. In other words, the first optical fibers 53 may be connected to each other and the second optical fibers 63 may be connected to each other using connector components without the amplifying function. Furthermore, the number of each of the first optical fiber 53 and of the second optical fiber 63 may be one.

In the preferred embodiments described above, an adjacent pair of the first optical fibers 53 may be laid in such a manner that an end of one of the first optical fiber 53 overlap with the end of the other first optical fiber 53. With this configuration, it is possible to reduce the possibilities of a section without light leakage to be formed in the leaky section of the first optical fibers 53. Therefore, it is possible to reduce the possibilities of the communication being interrupted at the part where the first optical fibers 53 are connected.

Explained in the preferred embodiments described above is an example in which the first optical fiber 53 and the second optical fiber 63 are flexible, but the first optical fiber 53 and the second optical fiber 63 do not necessarily need to be flexible. In the preferred embodiments described above, as the configuration in which the first optical fiber 53 and the second optical fiber 63 are laid along the rail 2, various configurations may be adopted without limitation to the example illustrated in FIG. 2.

Preferred embodiments of the present invention provide optical communication systems applicable to overhead conveyor truck systems in a factory or a warehouse, for example, but the conveyor truck system (rail-guided truck) to which the optical communication system is applied is not limited to a particular system. Preferred embodiments of the present invention may provide optical communication systems applicable to overhead conveyor truck systems to convey a front opening unified pod (FOUP) in which a semiconductor wafer is housed, or an optical communication system applied to a ground conveyor truck system that conveys articles in a factory or a warehouse.

Figure 9:
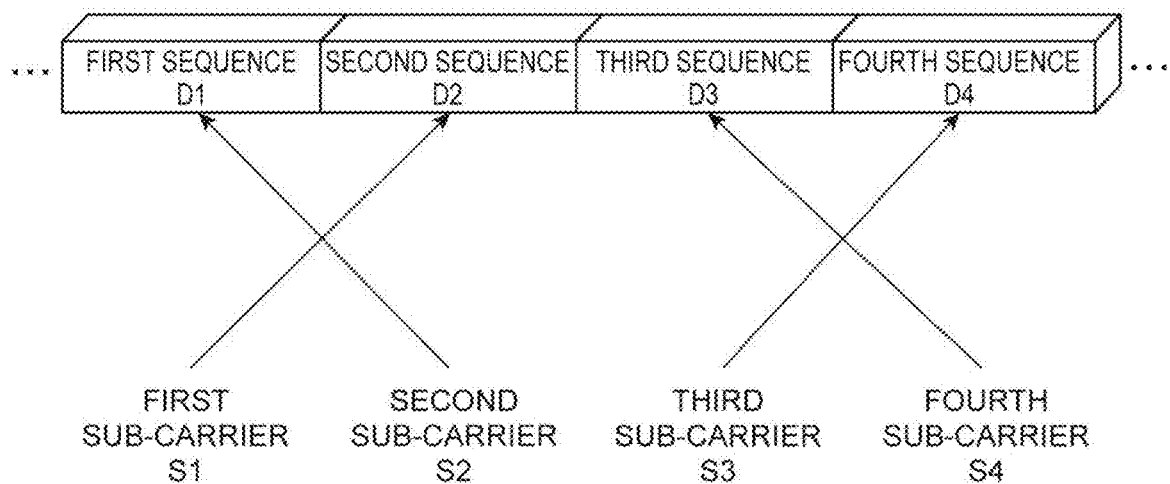
FIG. 9 is a diagram for explaining OFDM.
Figure 10:
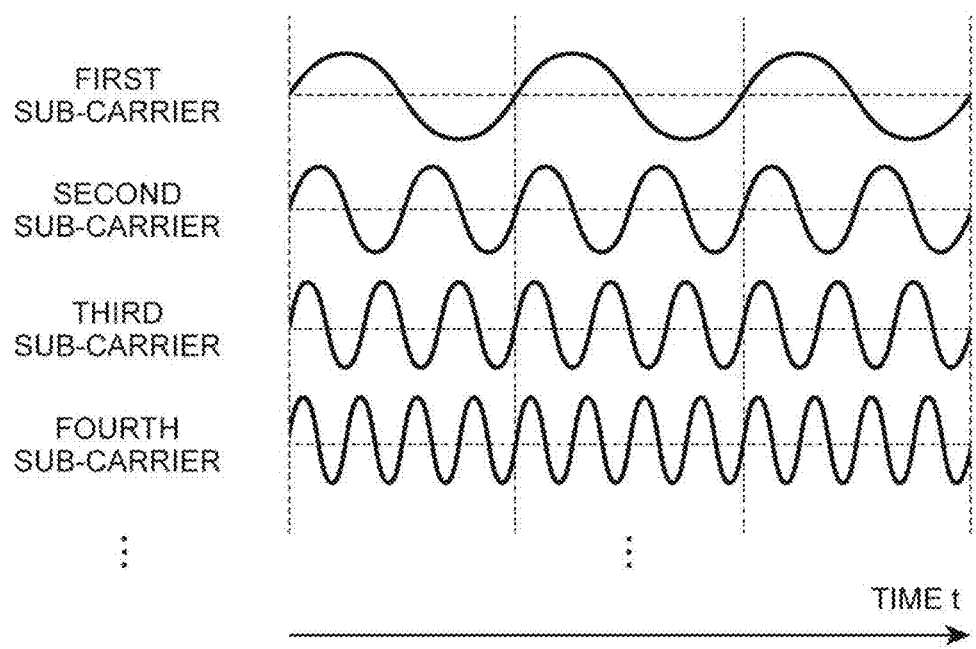
FIG. 10 is a diagram for explaining the OFDM.
Figure 11:
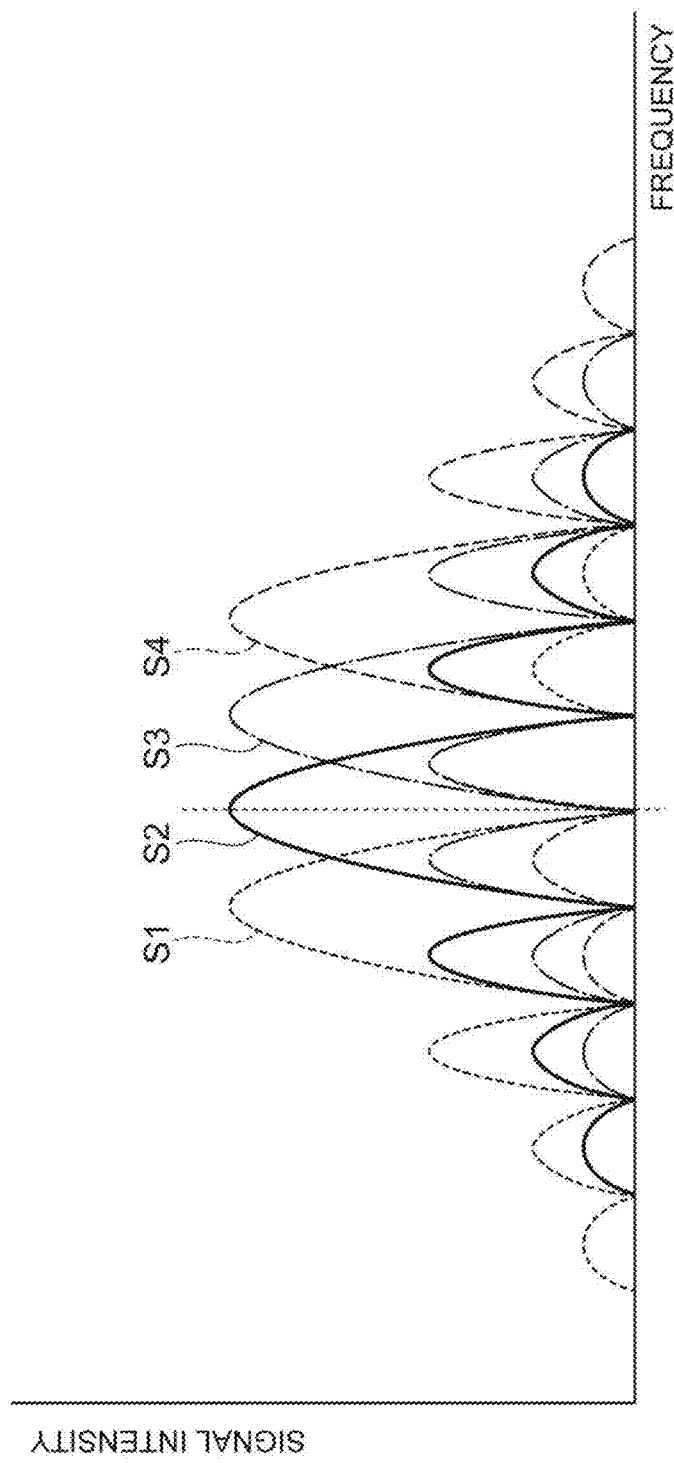
FIG. 11 is a diagram for explaining the OFDM.

Explained in the preferred embodiments described above is an example in which the baseband modulation that is one type of intensity modulation is used as a technique for modulating to first information to first signal, and modulating the second information to the second signal, but the modulation technique is not limited to a particular technique. The first converter 51 (see FIG. 1) may convert the first information into the first signal using a multi-carrier modulation. In the same manner, the second converter 61 (see FIG. 1) may convert the second information into the second signal using a multi-carrier modulation. As one example of the multi-carrier modulation, it is possible to use orthogonal frequency division multiplexing (OFDM). The OFDM multi-carrier modulation that is an application that can be implemented in at least one of the first converter 51 and the second converter 61 will now be explained with reference to FIGS. 9 to 11. FIGS. 9 to 11 are diagrams for explaining the OFDM.

In the OFDM, information to be transmitted (that is, the first information or the second information) is divided into several sequences, as illustrated in FIG. 9, for example. Different sub-carriers are then assigned to the respective sequences and modulated, and the information divided into the sequences are transmitted at once. In the example illustrated in FIG. 9, the information to be transmitted is divided into four sequences of a first sequence D1, a second sequence D2, a third sequence D3, and a fourth sequence D4, and the sequences are modulated using four kinds of sub-carriers, a first sub-carrier S1, a second sub-carrier S2, a third sub-carrier S3, and a fourth sub-carrier S4. Each of the first to the fourth sub-carriers S1, S2, S3, S4 have a frequency that is different from one another, as illustrated in FIG. 10. The sub-carriers S1, S2, S3, S4 used in the OFDM are orthogonal to one another. Being "orthogonal" herein means that the waves corresponding to the first to the fourth sub-carriers S1, S2, S3, S4 have their phase shifted by 90 degrees. Plotting the relation between the signal intensity and the frequency of the first to the fourth sub-carriers S1, S2, S3, S4, the waveforms will be as illustrated in FIG. 11, for example. In the waveform of each of the sub-carriers S1, S2, S3, S4, the side lobes are suppressed. Because the sub-carriers S1, S2, S3, S4 are orthogonal to one another, the sub-carriers S1, S2, S3, S4 become overlapped in such a manner that the center frequency (where the power density is maximum) of one of the sub-carriers S1, S2, S3, S4 is matched with the null point (where the power density is zero) of the other sub-carriers. For example, at the center frequency of the second sub-carrier S2, the signal intensity of the first sub-carrier S1, the third sub-carrier S3, and the fourth sub-carrier S4 are all zero. Therefore, even when a plurality of sub-carriers are superimposed within (that is, even if a plurality of sub-carriers are bundled into) a limited frequency range, an interference between the sub-carriers can be suppressed.

By performing the conversion of the first information into the first signal using the OFDM multi-carrier modulation, it is possible to transmit divided pieces of the first information simultaneously in a manner superimposed (multiplexed) over one another. Therefore, a high-speed multi-channel is achieved. Hence, a high-speed communication can be achieved in the first communication system 50. By converting the second information into a second signal using the OFDM multi-carrier modulation, it is possible to transmit divided pieces of the second information simultaneously in a manner superimposed (multiplexed) over one another. Therefore, a high-speed multi-channel is achieved. Hence, high-speed communication can be achieved in the second communication system 60. The modulation technique used in the first converter 51 may be different from, or the same as that used in the second converter 61.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An optical communication system for use with a rail-guided truck that includes a rail, at least one truck movable along the rail, and a controller configured or programmed to exchange information with the at least one truck, the optical communication system comprising:
    a first communication system to communicate first information from the controller to the at least one truck; and
    a second communication system to communicate second information from the at least one truck to the controller; wherein
    the first communication system includes:
        a first light emitter connected to the controller to output the first information in a form of light;
        a first optical fiber being an optical fiber laid along the rail to transport the light output from the first light emitter while letting the light leak therefrom; and
        a first light receiver mounted on the at least one truck to receive the light leaking from the first optical fiber;
        a first converter to convert the first information into a first signal output in the form of light from the first light emitter; and
        a first inverse converter mounted on the at least one truck to convert the first signal received in the form of light by the first light receiver into the first information; and
    the second communication system includes:
        a second light emitter mounted on the at least one truck to output the second information in a form of light;
        a second optical fiber being an optical fiber laid along the rail to transport the light output from the second light emitter and input to the second optical fiber at some point along the second optical fiber, or to transport light generated by the light output from the second light emitter and input to the second optical fiber at some point along the second optical fiber;
        a second light receiver connected to the controller to receive the light transported over the second optical fiber;
        a second converter mounted on the at least one truck to convert the second information into a second signal output in the form of light from the second light emitter; and
        a second inverse converter to convert the second signal received in the form of light by the second light receiver into the second information.

2. The optical communication system according to claim 1, wherein
    the second optical fiber includes a core doped with a fluorescent dye.

3. The optical communication system according to claim 1, wherein
    the second optical fiber includes a core doped with a rare earth.

4. The optical communication system according to claim 1, wherein the second optical fiber includes a micro-lens array to collect the light incident on an outer circumferential surface of the second optical fiber into the second optical fiber.

5. The optical communication system according to claim 1, wherein the first converter converts the first information into the first signal using a multi-carrier modulation.

6. The optical communication system according to claim 1, wherein the second converter converts the second information into the second signal using a multi-carrier modulation.

7. The optical communication system according to claim 1, wherein the light includes at least one of infrared light, visible light, and ultraviolet light.

8. The optical communication system according to claim 1, further comprising a plurality of the first optical fibers; wherein
    the plurality of first optical fibers are connected to each other serially via an amplifier.

9. The optical communication system according to claim 1, further comprising a plurality of the second optical fibers, wherein
    the plurality of second optical fibers are connected to each other serially via an amplifier.

10. The optical communication system according to claim 1, wherein the second optical fiber includes a plurality of slits on an outer circumferential surface of the second optical fiber.

11. The optical communication system according to claim 2, wherein a wavelength range of the light transported over the first optical fiber is different from that of the light output from the second light emitter.

12. The optical communication system according to claim 1, wherein the first optical fiber and the second optical fiber are flexible.

* * * * *